United States Patent
Chang et al.

(10) Patent No.: US 11,623,563 B2
(45) Date of Patent: Apr. 11, 2023

(54) SOUND GENERATING APPARATUS AND METHOD FOR VEHICLE

(71) Applicants: HYUNDAI MOTOR COMPANY, Seoul (KR); KIA MOTORS CORPORATION, Seoul (KR); Konkuk University Industrial Cooperation Corp, Seoul (KR)

(72) Inventors: Kyoung Jin Chang, Suwon-si (KR); Young Hoon Cho, Seongnam-si (KR); Do Hong Lee, Gyeongsangnam-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 256 days.

(21) Appl. No.: 16/944,807

(22) Filed: Jul. 31, 2020

(65) Prior Publication Data
US 2021/0309147 A1    Oct. 7, 2021

(30) Foreign Application Priority Data
Apr. 3, 2020  (KR) .................. 10-2020-0041121

(51) Int. Cl.
*H02P 7/06*  (2006.01)
*B60Q 5/00*  (2006.01)

(52) U.S. Cl.
CPC .............. *B60Q 5/008* (2013.01); *H02P 7/06* (2013.01)

(58) Field of Classification Search
CPC .......... B60Q 5/008; H02P 7/06; H02P 27/06; H04R 3/00
See application file for complete search history.

(56) References Cited

U.S. PATENT DOCUMENTS

| | | | | |
|---|---|---|---|---|
| 5,537,967 A | * | 7/1996 | Tashiro | B60W 20/00 123/192.1 |
| 2008/0116832 A1 | * | 5/2008 | Yamada | H02P 6/10 318/474 |
| 2010/0134058 A1 | * | 6/2010 | Nagashima | H02P 21/06 180/65.285 |
| 2011/0087403 A1 | * | 4/2011 | Fujikawa | G10K 15/02 701/36 |
| 2014/0152206 A1 | * | 6/2014 | Kimpara | B62D 5/046 318/400.02 |
| 2014/0172209 A1 | * | 6/2014 | Ide | B60W 10/184 701/22 |

(Continued)

FOREIGN PATENT DOCUMENTS

CN    113497997 A    10/2021
KR    10-2021-0017699 A    2/2021

OTHER PUBLICATIONS

Office Action issued in corresponding U.S. Appl. No. 17/217,304 dated Mar. 22, 2022.

*Primary Examiner* — Erick D Glass
(74) *Attorney, Agent, or Firm* — Morgan, Lewis & Bockius LLP

(57) ABSTRACT

A sound generating apparatus for a vehicle includes: a motor controller that generates a motor torque corresponding to a target sound; and an output device that outputs the target sound based on vibration generated by the motor torque to generate a sound of the vehicle without requiring an external amplifier or a separate actuator, thus preventing increases in cost and weight.

15 Claims, 15 Drawing Sheets

(56) References Cited

U.S. PATENT DOCUMENTS

| | | |
|---|---|---|
| 2018/0114445 A1* | 4/2018 | Jang .......................... B60R 1/00 |
| 2021/0044236 A1 | 2/2021 | Chang |
| 2021/0309147 A1 | 10/2021 | Chang et al. |
| 2021/0379998 A1 | 12/2021 | Lee et al. |

* cited by examiner

SOUND GENERATING APPARATUS AND METHOD FOR VEHICLE

CROSS-REFERENCE TO RELATED APPLICATION

This application claims the benefit of priority to Korean Patent Application No. 10-2020-0041121, filed in the Korean Intellectual Property Office on Apr. 3, 2020, the entire contents of which are incorporated herein by reference.

TECHNICAL FIELD

The present disclosure relates to a sound generating apparatus and method for a vehicle.

BACKGROUND

Recently, a technology for generating a driving sound desired by a user using a speaker or an electric actuator in a vehicle has been developed. The technology requires an external amplifier or a separate actuator for sound control, and thus has a problem of increasing cost and weight.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides a vehicle sound generating apparatus and method capable of generating a vehicle sound without requiring an external amplifier or a separate actuator. And an aspect of the present disclosure provides a vehicle sound generating apparatus and method capable of generating a vehicle sound using motors (DC motors) mounted in a vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a sound generating apparatus for a vehicle may include: a motor controller that generates a motor torque corresponding to a target sound; and an output device that outputs the target sound based on vibration generated by the motor torque.

The motor controller may include a target signal setting device that outputs a target current for generating the target sound, a motor control circuit device that calculates a motor drive control voltage based on the target current, a motor drive device that adjusts a motor drive current based on the motor drive control voltage, and a motor that generates the motor torque when the motor drive current is applied thereto.

The target signal setting device may include an AD converter that converts a set sound corresponding to the target sound into a digital signal, a target sound signal generator that filters the digital signal, a motor-specific function operating signal generator that operates a motor-specific function, and a signal synthesizer that outputs the target current by synthesizing signals output from the target sound signal generator and the motor-specific function operating signal generator.

The motor control circuit device may include a Proportional-Integral-Derivative (PID) controller that receives power of a motor control power supply and performs feedback control of the target current, a noise processor that removes a noise of the target current on which the feedback control has performed, and a Pulse-Width Modulation (PWM) control circuit device that calculates the motor drive control voltage based on the target current processed by the PID controller and the noise processor.

The noise processor may compare a value of the target current on which the feedback control is performed from the PID controller with a preset reference value in a magnitude, determine whether an overshoot in which the value of the target current on which the feedback control is performed exceeds the reference value, when the overshoot occurs, remove the overshoot, when the overshoot does not occur, detect a signal waveform of the target current on which the feedback control is performed, determine whether distortion of the waveform occurs by comparing the signal waveform of the target current on which the feedback control is performed with a target waveform corresponding to the target sound, and when the signal waveform of the target current on which the feedback control is performed is distorted, remove the distortion using a digital filter.

The motor drive device may include a gate driver circuit device including a plurality of gate drivers that control a state of a motor drive switch according to the motor drive control voltage, and a motor drive circuit device including the motor drive switch that adjusts the motor drive current output to the motor and a current sensor circuit device.

The motor may rotate a rotor provided in the motor to generate the motor torque when an electric field is generated in the motor by applying the motor drive current and include a drive shaft of the motor that vibrates due to the motor torque and a stator of the motor.

The output device may include a motor mounting portion that transfers vibration generated by the motor torque, and a vehicle body panel that generates the target sound due to the vibration of the motor mounting portion.

The motor mounting portion may include a motor mounting bracket that vibrates due to vibration of a stator of the motor, a drive gear provided on one side of a drive shaft of the motor to vibrate due to the vibration of the drive shaft of the motor, a reduction gear that receives the vibration by rotating while being engaged with the drive gear, a linear motion gear that is driven while being engaged with the reduction gear to receive the vibration, and a gear mounting portion provided with the linear motion gear.

The vehicle body panel may include a motor mounting body panel that outputs the target sound by vibration transferred to a motor mounting bracket, and a gear mounting body panel that outputs the target sound by vibration transferred to a gear mounting portion.

When the plurality of output devices are provided, a plurality of motor controllers may be arranged as many as the number of the plurality of output devices to generate the plurality of target sounds.

When the plurality of output devices are provided, the set sound may be input to a plurality of target signal setting devices.

When there are a plurality of output sounds, the plurality of target signal setting devices may communicate with one another to share the set sound when the set sound is input to one of the target signal setting devices.

When there are a plurality of output sounds, when the set sound is input to one of the target signal setting devices, the one target signal setting device to which the set sound may be input communicates with a target signal setting device to which the set sound is not input to share the set sound.

According to another exemplary embodiment of the present disclosure, a sound generating method for a vehicle may include: generating a motor torque corresponding to a target sound; and outputting the target sound based on vibration generated by the motor torque.

The generating of the motor torque corresponding to the target sound may include outputting a target current for generating the target sound, calculating a motor drive control voltage based on the target current, adjusting a motor drive current based on the motor drive control voltage, and generating the motor torque when the motor drive current is applied thereto.

The outputting of the target sound may include transferring vibration generated by the motor torque to a vehicle body panel to generate the target sound.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
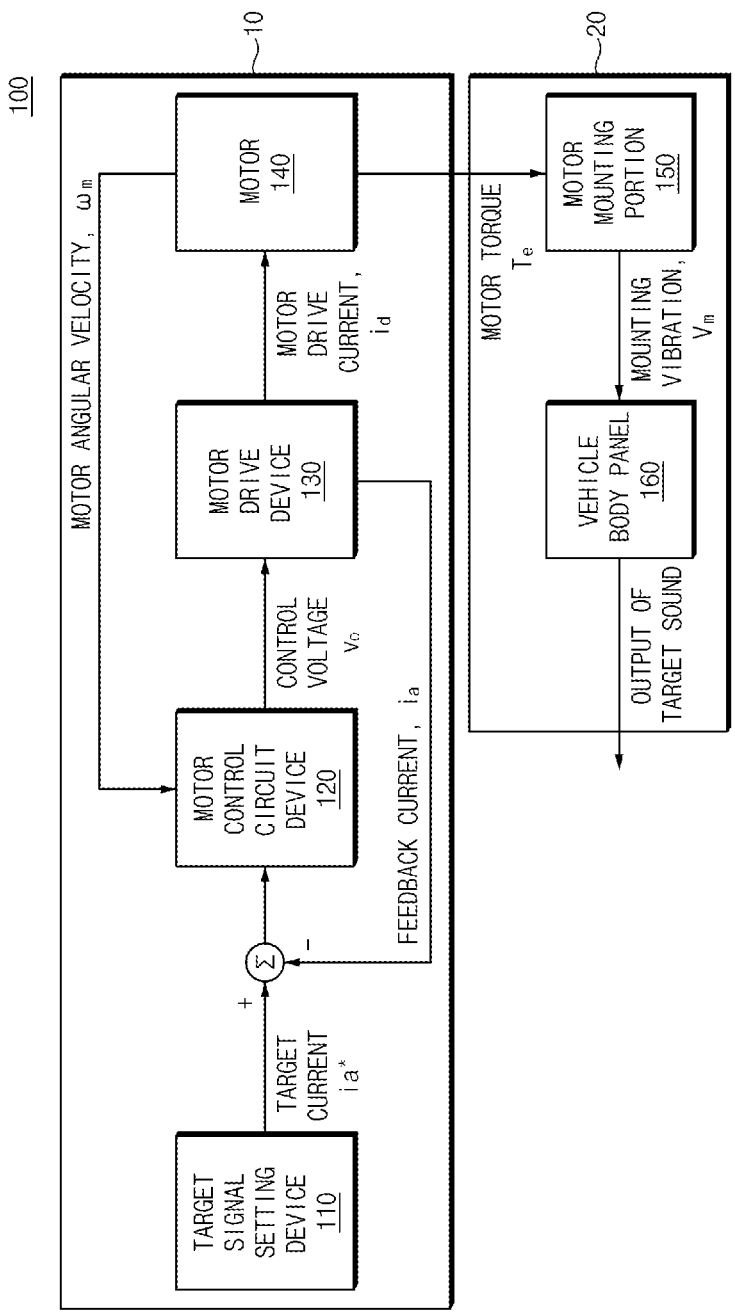
FIG. 1 is a view showing a configuration and a signal flow of a sound generating apparatus for a vehicle according to an exemplary embodiment of the present disclosure.

Hereinafter, exemplary embodiments of the present disclosure will be described in detail with reference to the exemplary drawings. In adding reference numerals to the components of each drawing, it should be noted that the same reference numerals are assigned to the same components as much as possible even though they are shown in different drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram showing a configuration and a signal flow of a sound generating apparatus for a vehicle according to an exemplary embodiment of the present disclosure.

As shown in FIG. 1, a sound generating apparatus 100 for a vehicle according to an exemplary embodiment of the present disclosure may include a motor controller 10 and an output device 20. According to an exemplary embodiment of the present disclosure, the sound generating apparatus 100 for a vehicle may generate a vehicle sound through a DC motor.

The motor controller 10 may generate a motor torque corresponding to a target sound. To this end, the motor controller 10 may include a target signal setting device 110 that outputs a target current ia* for generating a target sound, a motor control circuit device 120 that calculates a motor drive control voltage v0 based on the target current ia*, a motor drive device 130 that adjusts a motor drive current id based on the motor drive control voltage v0, and a motor 140 that generates a motor torque Te when the motor drive current id is applied thereto. In addition, the output device 20 may output a target sound based on vibration generated by the motor torque and for this purpose, may include a motor mounting portion 150 that transfers the vibration Vm generated by the motor torque Te to a vehicle body panel 160 that generates the target sound by the vibration Vm of the motor mounting portion. First, a more detailed description for configurations of the motor controller 10 will be given with reference to FIGS. 2 to 5.

Figure 2:
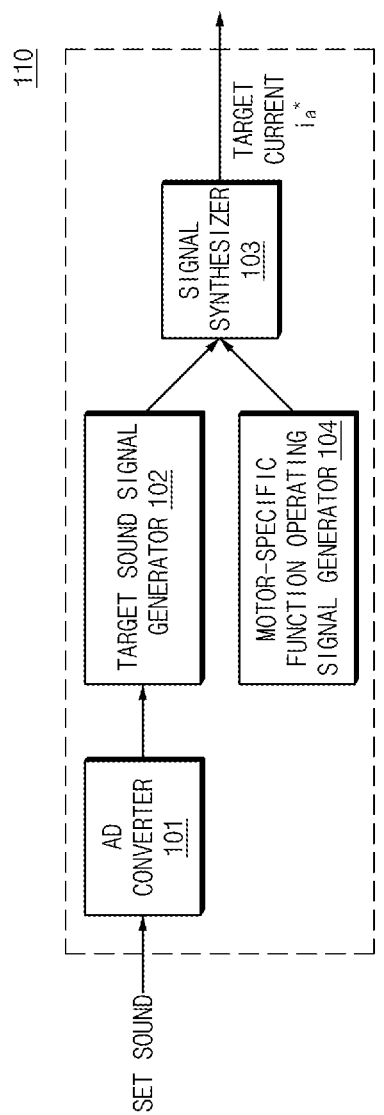
FIG. 2 is a view showing a configuration and a signal flow of a target signal setting device according to an exemplary embodiment of the present disclosure.

FIG. 2 is a diagram showing a configuration and a signal flow of a target signal setting device according to an exemplary embodiment of the present disclosure.

As shown in FIG. 2, the target signal setting device 110 may include an AD converter 101 that converts a setting sound corresponding to the target sound into a digital signal, a target sound signal generator 102 that filters the digital signal through, for example, a low-pass filter or a high-pass filter, a motor-specific function operating signal generator 104 for initiating operation of a motor-specific function, and a signal synthesizer 103 that synthesizes signals, output from the target sound signal generator 102 and the motor-specific function operating signal generator 104, to output a target current ia*. Here, the set sound corresponding to the target sound may mean an output sound desired by the user, and may include, for example, music, an engine sound of a vehicle, a vehicle alert sound for a direction indication, and the like. Further, the motor-specific function may include operations of vehicle devices by a DC motor provided in the vehicle. As an example, the motor-specific function may include an operation of opening and closing a window, an operation of a wiper of a windshield glass, forward and backward movement of a sunroof or an electric power seat, and the like. The target signal setting device 110 of the present disclosure may output the target sound using the motor torque generated by the motor. Therefore, it may be that a signal for generating a sound uses a frequency of 30 Hz or more and a signal for operating the motor-specific function uses a signal of 10 Hz or a DC component such that a signal for generating the sound and a signal for operating the motor-specific function do not interfere with each other.

Figure 3:
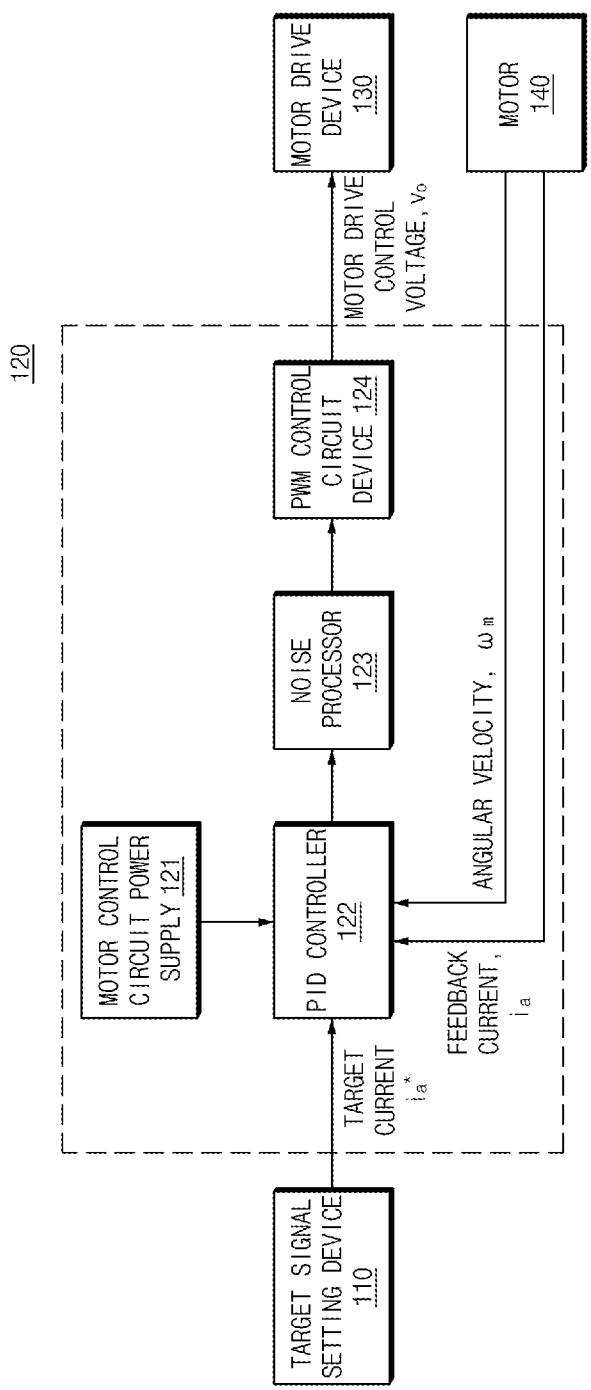
FIG. 3 is a view showing a configuration and a signal flow of a motor control circuit according to an exemplary embodiment of the present disclosure.

FIG. 3 is a diagram showing a configuration and a signal flow of a motor control circuit according to an exemplary embodiment of the present disclosure.

As shown in FIG. 3, the motor control circuit device 120 may include a Proportional-Integral-Derivative (PID) controller 122 that receives power of a motor control power supply 121 and performs feedback control of the target current ia*, a noise processor 123 that removes a noise of the target current on which the feedback control has performed and a Pulse-Width Modulation (PWM) control circuit device 124 that calculates the motor drive control voltage v0 from the target current processed by the PID controller 122 and the noise processor 123.

The PID controller 122 may perform feedback control using a feedback current ia received from the motor 140 and an angular velocity ωm of the motor 140. When the angular velocity of the motor 140 is not measured, the angular velocity may be calculated through a motor angular velocity estimation formula which has been modeled in advance, and feedback control may be performed using the calculated angular velocity.

The noise processor 123 may receive a signal from the PID controller 122 and identify a magnitude of a voltage, compare the magnitude with a preset reference value, and determine whether an overshoot has occurred in which the magnitude of the voltage of the signal received from the PID controller 122 exceeds the preset reference value. The noise processor 123 may remove the overshoot when the overshoot has occurred, and detect a signal waveform when the overshoot has not occurred. The noise processor 123 may determine whether or not waveform distortion occurs by comparing the signal waveform with a target waveform corresponding to the target sound and, when the signal waveform is distorted, remove the distortion using a digital filter. An operation of the noise processor 123 will be described in detail with reference to FIG. 8.

The PWM control circuit device 124 may calculate a duty ratio of the target current from which the noise has been removed.

Figure 4:
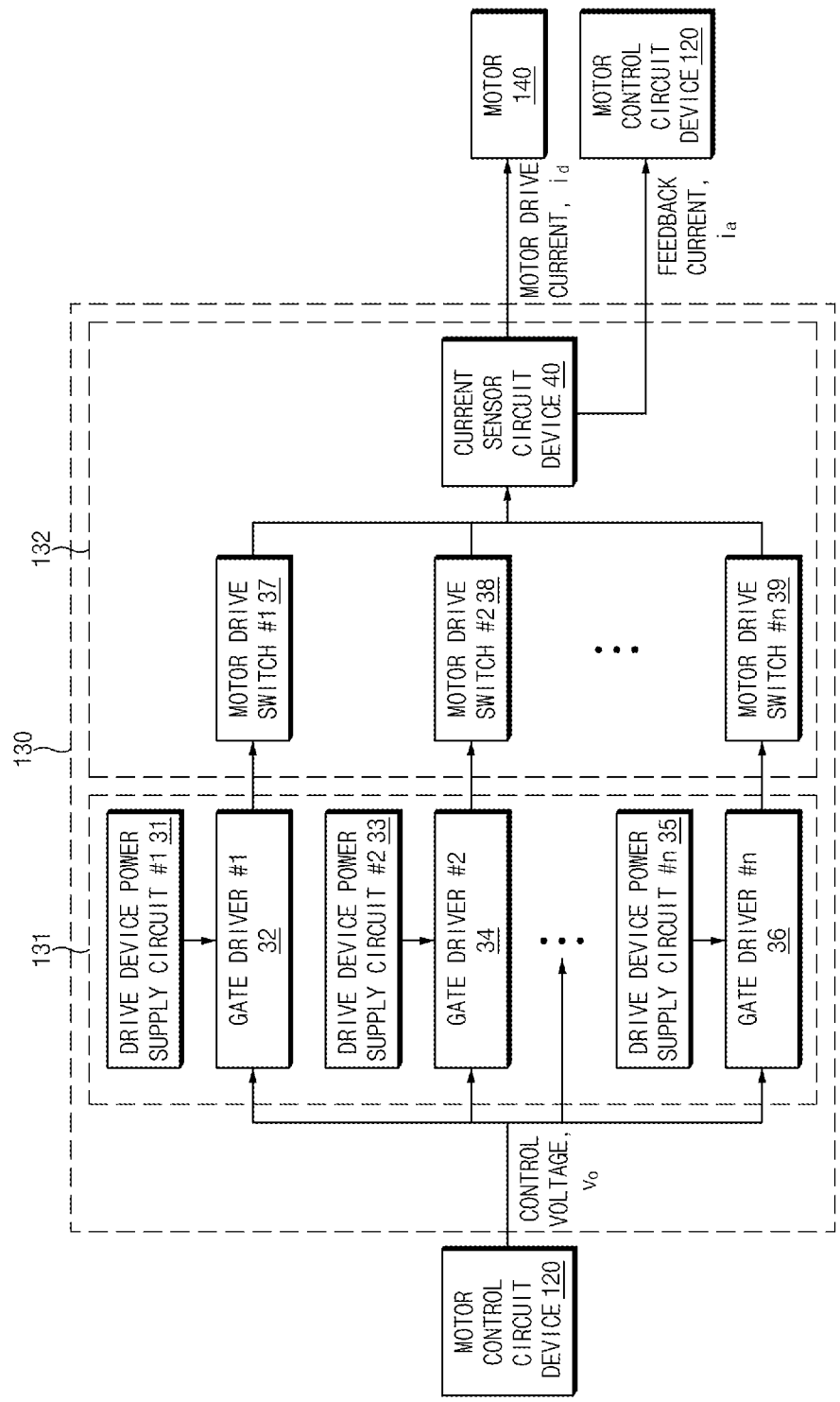
FIG. 4 is a view showing a configuration and a signal flow of a motor drive device according to an exemplary embodiment of the present disclosure.

FIG. 4 is a diagram showing a configuration and a signal flow of a motor drive device according to an exemplary embodiment of the present disclosure.

As shown in FIG. 4, the motor drive device 130 may include a gate driver circuit device 131 including a plurality of gate drivers 32, 34 and 36 which control states of motor drive switches according to a motor drive control voltage calculated by the motor control circuit device 120, and a motor drive circuit device 132 including the motor drive switches 37, 38 and 39 which adjust a motor drive current output to the motor 140 and a current sensor circuit device 40.

The gate drivers 32, 34, and 36 may control the states of the motor drive switches 37, 38 and 39 according to a signal v0 input to the gate driver, respectively. According to an exemplary embodiment, the gate drivers 32, 34, and 36 may be connected to the motor drive switches 37, 38 and 39 correspondingly, and control on/off states of the motor drive switches 37, 38 and 39. The current sensor circuit device 40 may detect the amount of current of the motor drive current id output from the motor drive switches 37, 38, and 39 to the motor 140 and feed it back to the motor control circuit device 120.

The motor drive current id output from the motor drive circuit device 132 may be used to drive the motor 140. According to an exemplary embodiment, a control model of the motor 140 may be shown as in FIG. 5.

Figure 5:
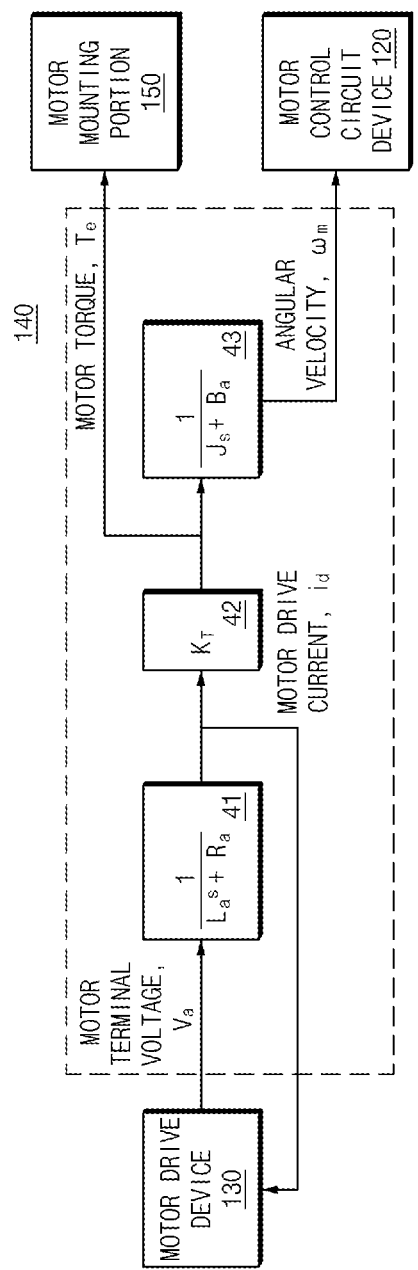
FIG. 5 is a view showing a current control model and a signal flow of a motor according to an exemplary embodiment of the present disclosure.

FIG. 5 is a diagram showing a current control model and a signal flow of a motor according to an exemplary embodiment of the present disclosure.

As shown in FIG. 5, a current control model of the motor may include a first transfer function 41, which means an equation for determining the motor drive current id based on an inductance La (see FIG. 9) and a resistance Ra (see FIG. 9) when the voltage Va output from the motor drive device 130 is applied to the motor. In addition, when the motor drive current id is determined by the first transfer function 41, a magnetic flux is formed inside the motor due to the motor drive current, and a motor torque is generated by the magnetic flux. The current control model may include a second transfer function 42 representing a motor torque constant because the motor torque is proportional to the motor drive current id and the motor torque constant. In addition, when the motor torque is applied to a mechanical apparatus (where the mechanical apparatus may include a propeller provided on a motor shaft), a rotational speed of an object may be determined by the moment of inertia "J" and the coefficient of friction "B" of the mechanical apparatus, and the current model may include a third transfer function 43 representing an equation for determining the rotational speed of the above-described object.

Figure 6:
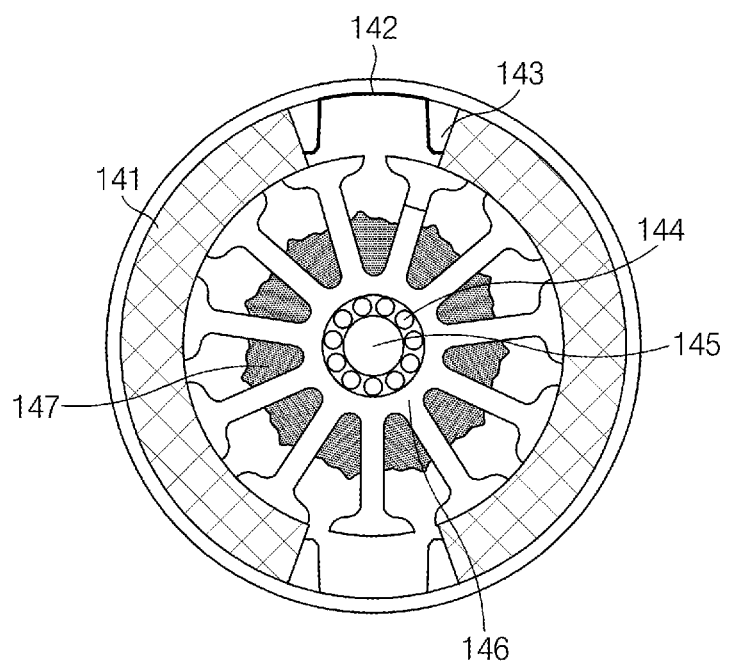
FIG. 6 is a plan view showing a motor according to an exemplary embodiment of the present disclosure.

FIG. 6 is a plan view showing a motor according to an exemplary embodiment of the present disclosure.

As shown in FIG. 6, when a current is supplied to a coil winding 147 of the motor 140 through a brush 143, an electric field may be generated in the motor 140, and the magnetic flux may be generated by the electric field in a permanent magnet 141, causing a rotor 146 to rotate. The motor torque may be generated due to the rotation of the rotor 146. The motor torque may be transferred to a drive shaft 145, and the motor torque may be transferred to a ball bearing 144 surrounding the drive shaft 145 to vibrate a stator 142, thus outputting a target sound by the vibration of the stator 142. A more detailed description related to the target sound will be given with reference to FIG. 7.

Figure 7:
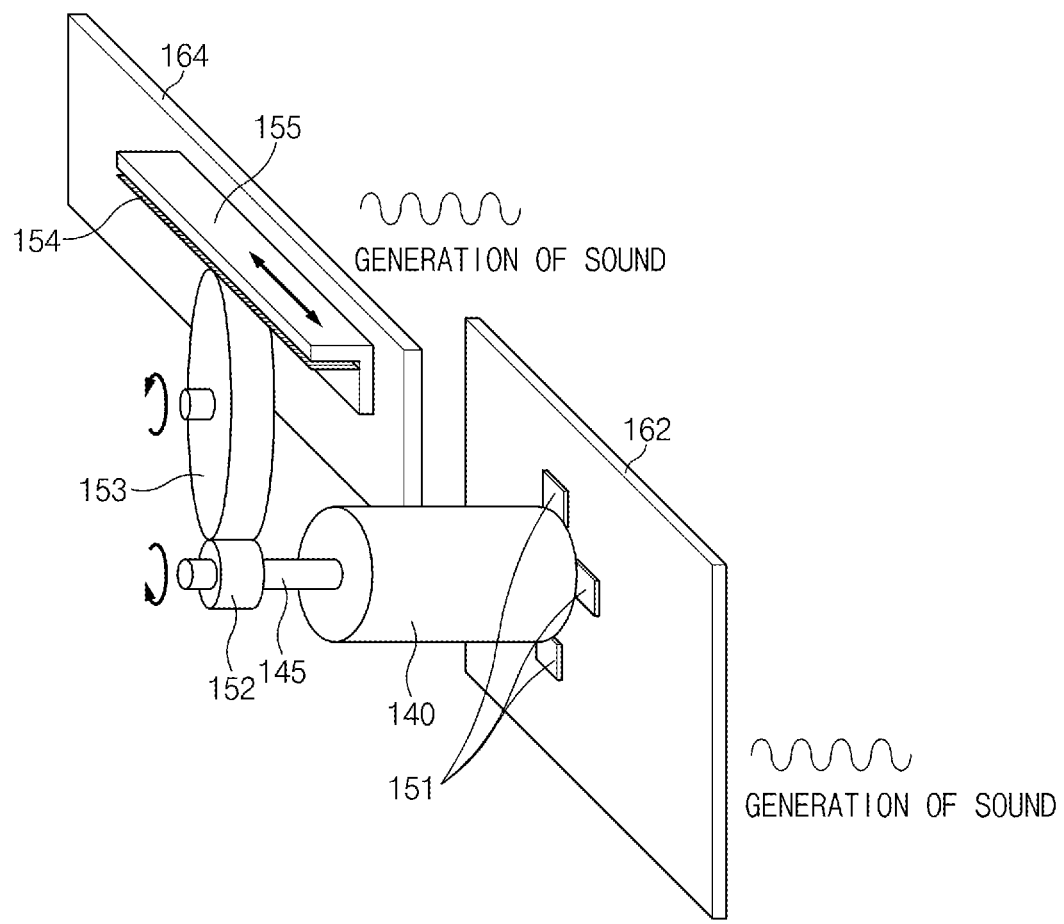
FIG. 7 is a view showing a configuration of a motor mounting portion and a vehicle body panel according to an exemplary embodiment of the present disclosure.

FIG. 7 is a view showing a configuration of a motor mounting portion and a vehicle body panel according to an exemplary embodiment of the present disclosure.

As shown in FIG. 7, the motor mounting portion 150 may include a motor mounting bracket 151, a drive gear 152, a reduction gear 153, a linear motion gear 154, and a gear mounting portion 155. The vehicle body panel 160 may include a motor mounting body panel 162 and a gear mounting body panel 164.

The motor mounting bracket 151 may be vibrated by the stator 142 vibrating by the ball bearing 144 of FIG. 6, and the motor mounting body panel 162 may be vibrated as the motor mounting bracket 151 vibrates to output the target sound. Here, the target sound may mean a structure borne sound due to a structure.

In addition, the drive gear 152 may receive the motor torque transferred to the drive shaft 145 and the motor torque transferred to the drive gear 152 may be transferred to the reduction gear 153. The motor torque transferred to the reduction gear 153 may be transferred to the linear motion gear 154 in the case of opening/closing a window or a sunroof to vibrate the gear mounting portion 155, and the vibration of the gear mounting portion 155 may cause the gear mounting body panel 164 to vibrate to output the target sound.

Here, it may be required to increase radiation efficiency of the motor mounting body panel 162 or the gear mounting body panel 164 to output a target sound with a sufficient volume in a desired frequency band and for this purpose, an area of the panel may be increased and a thickness of the panel may be thin and the panel with a material having a high modulus of elasticity may be provided.

Figure 8:
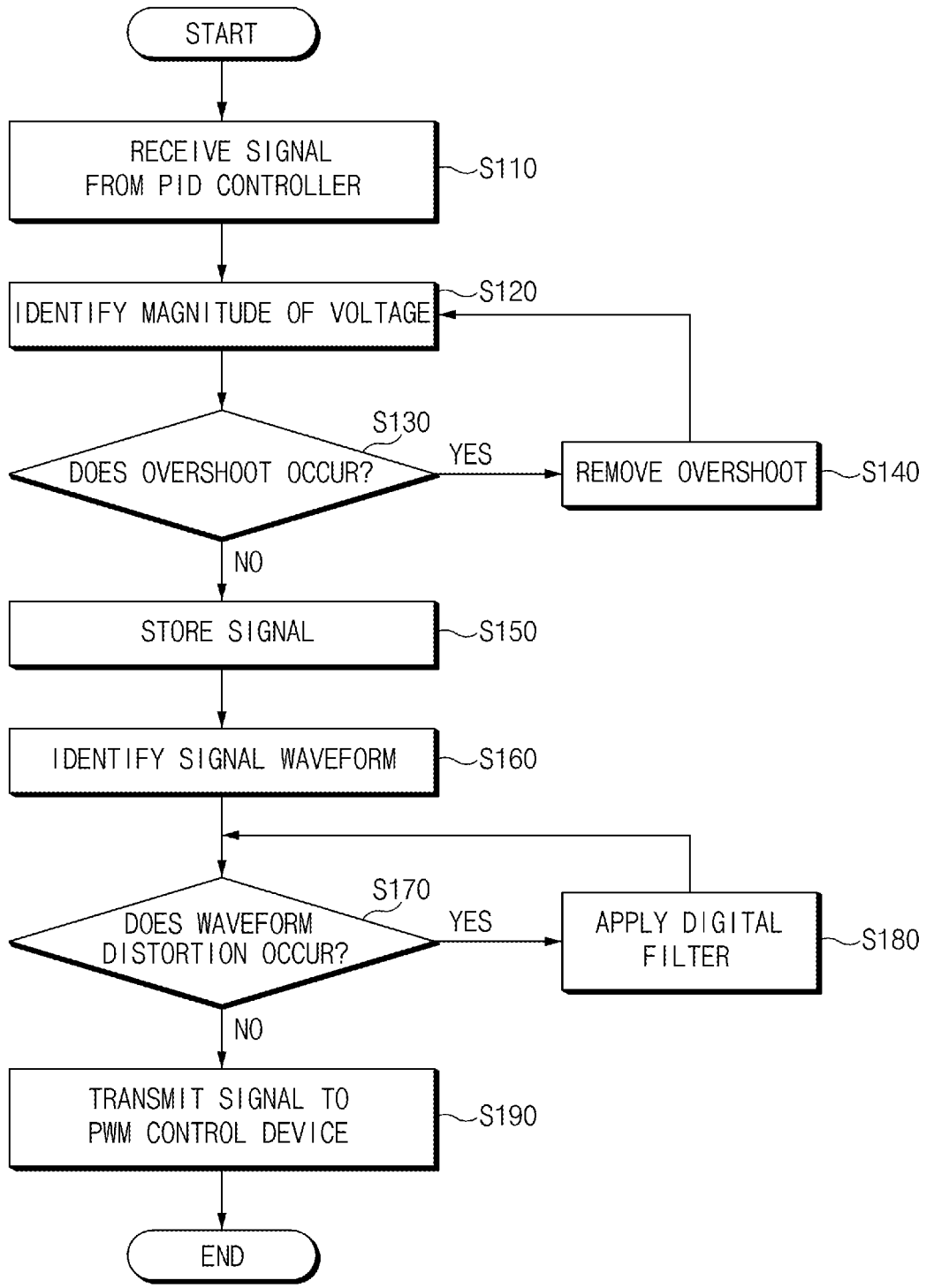
FIG. 8 is a flowchart of a noise removal method according to an exemplary embodiment of the present disclosure.

FIG. 8 is a flowchart of a noise removal method according to an exemplary embodiment of the present disclosure.

As shown in FIG. 8, the noise processor 123 may receive a signal from the PID controller 122 (S110), and identify a magnitude of a voltage of the received signal (S120). The noise processor 123 may compare the magnitude of the voltage of the received signal with a preset reference value, and determine whether an overshoot has occurred in which the magnitude of the voltage of the signal received from the PID controller 122 exceeds the preset reference value (S130). When an overshoot occurs (YES) in S130, the noise processor 123 may remove the overshoot (S140) and when an overshoot does not occur (NO), store the signal (S150), and detect a waveform of the signal (S160). The noise processor 123 may determine whether or not distortion of the waveform occurs by comparing the signal waveform with a target waveform corresponding to the target sound (S170). When determining that the signal waveform is distorted (YES) in S170, the noise processor 123 may remove the distortion using a digital filter (S180). When determining that the signal waveform is not distorted (NO) in S170, the noise processor 123 may output the signal to the PWM control circuit device 124 (S190).

Figure 9:
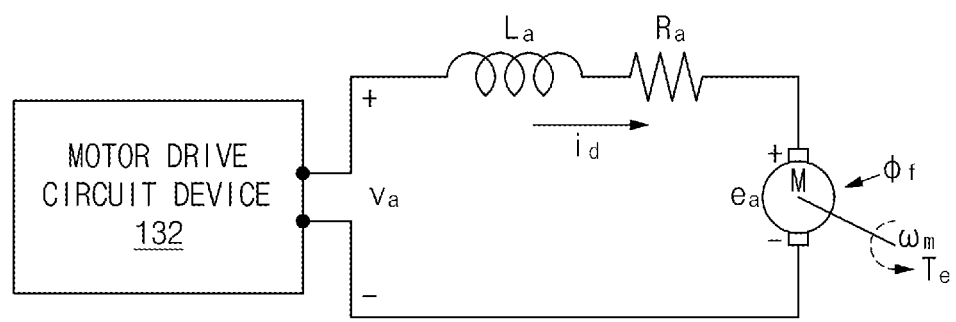
FIG. 9 is a view showing a motor drive circuit and an equivalent circuit of a motor according to an exemplary embodiment of the present disclosure.

FIG. 9 is a view showing a motor drive circuit and an equivalent circuit of a motor according to an exemplary embodiment of the present disclosure.

The motor 140 according to an exemplary embodiment of the present disclosure may be connected to the motor drive circuit device 132 and may be illustrated as an equivalent circuit as shown in FIG. 9. As shown in FIG. 9, the equivalent circuit of the motor 140 may include an inductance $L_a$, a resistance $R_a$, and a motor M, and the operation of the motor may be represented by a circuit equation of an armature voltage $V_a$, an induced electromotive force $e_a$ generated in the winding when the motor is driven, the a motor torque $T_e$ that is the torque generated when the motor is driven, and a motion equation $T_e$ of the motor, which may be represented by Equations 1 to 4, respectively.

$$v_o R_o i_d + L_a \frac{di_a}{dt} + e_a V_b \quad \text{[Equation 1]}$$

$V_a$: Armature circuit voltage (voltage applied to winding)
$R_a$: Resistance of winding
$L_a$: Inductance of winding
$e_a$: induced electromotive force generated in winding
$V_b$: Voltage drop component by brush
$i_d$: Current flowing through the winding $$e_a = k_e \cdot \phi_f \cdot \omega_m \quad \text{[Equation 2]}$$

$K_e$: Constant
$\phi_f$: Magnetic flux
$\omega_m$: Angular velocity $$T_e = k_T \cdot \phi_f \cdot i_d \quad \text{[Equation 3]}$$

$K_T$: Constant
$\phi_f$: Magnetic flux
$i_d$: Current flowing through winding $$T_e = J \frac{d\omega_m}{dt} + B\omega_m + T_L \quad \text{[Equation 4]}$$

J: Moment of rotational inertia
$\omega_m$: Angular velocity
B: Coefficient of friction
$T_L$: Load torque resisting motor rotation FIG. 10 is a diagram showing a configuration of a gate driver circuit designed according to an exemplary embodiment of the present disclosure.

Figure 10:
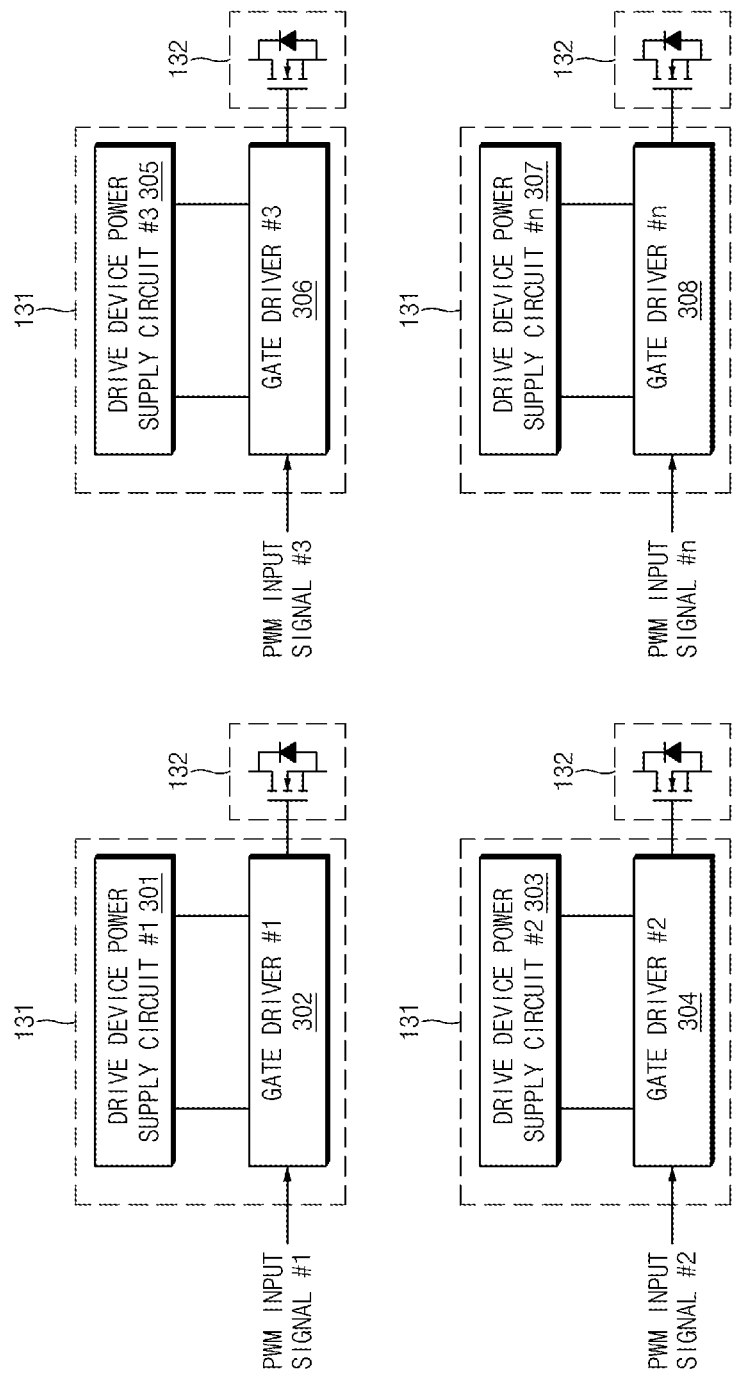
FIG. 10 is a diagram showing a configuration of a gate driver circuit designed according to an exemplary embodiment of the present disclosure.

As shown in FIG. 10, there may be a plurality of gate driver circuit devices 131 and each gate driver included in the gate driver circuit device 131 may receive a motor drive control voltage v0 output from the PWM control circuit device 124, as a PWM input signal.

Figure 11A:
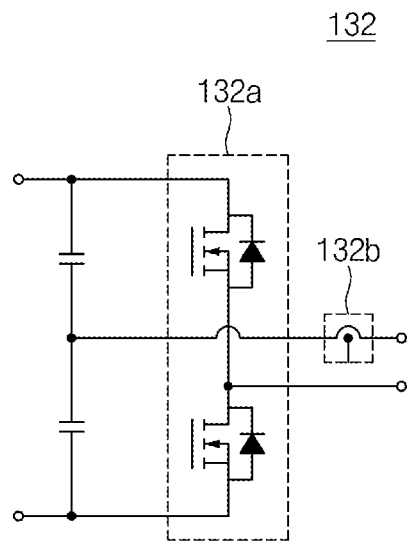
FIGS. 11A and 11B are views showing an arrangement of a motor drive circuit device according to an exemplary embodiment of the present disclosure.
Figure 11B:
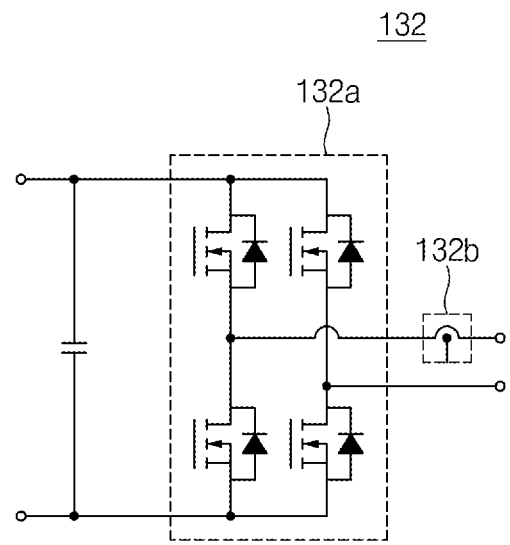

FIGS. 11A and 11B are views showing an arrangement of a motor drive circuit device according to an exemplary embodiment of the present disclosure.

As shown in FIG. 11A, a plurality of motor drive switches 132a included in the motor drive circuit device 132 may be arranged as half-bridge circuits. As shown in FIG. 11B, the plurality of motor drive switches 132a may be arranged as H bridge circuits.

Figure 12:
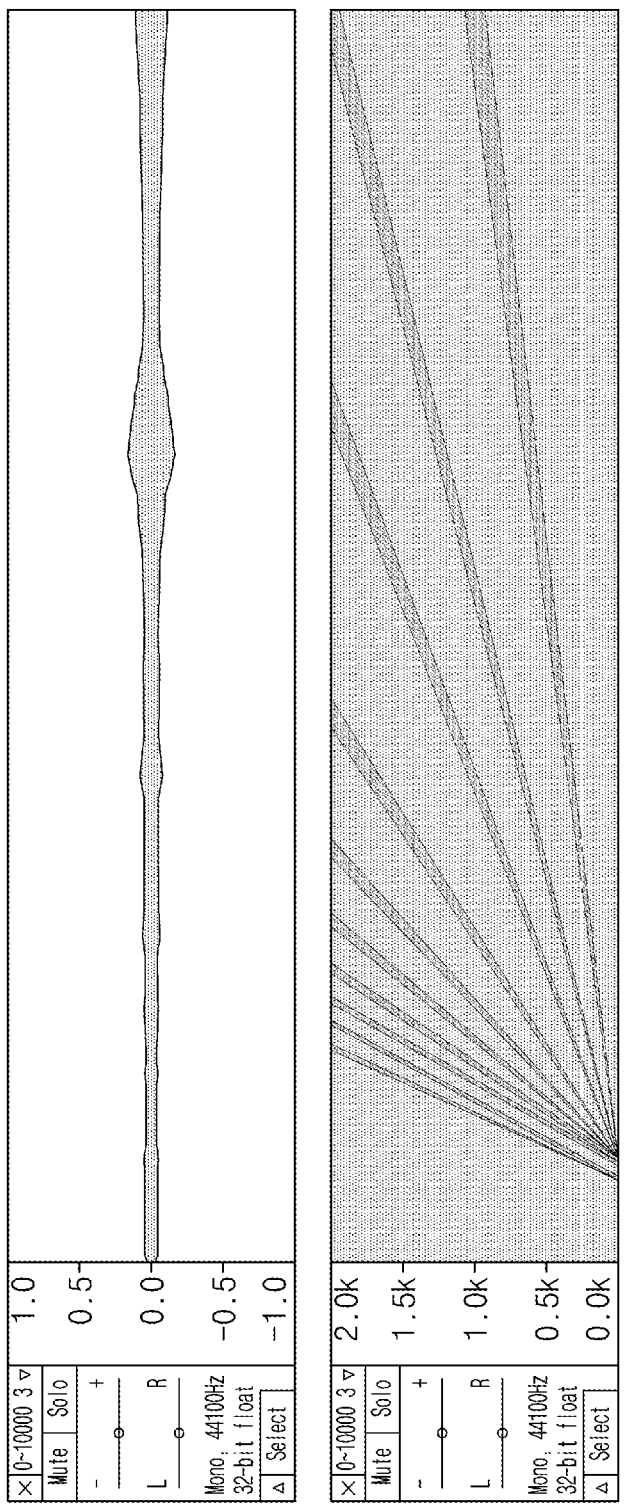
FIG. 12 is a graph showing a measurement result of target sound generated according to an exemplary embodiment of the present disclosure.

FIG. 12 is a graph showing a measurement result of target sound generated according to an exemplary embodiment of the present disclosure.

FIG. 12 is a result of measuring a target sound that is output when vibration is generated by setting a frequency variable Sin wave of a current of 3 A as a target sound according to the above-described embodiment of the present disclosure and applying it as a corresponding set sound. A graph on the upper side of FIG. 12 represents an output volume of the target sound over time, and a graph on the lower side of FIG. 12 represents a frequency spectrum over time, and it can be seen that the set target sound is output.

According to an exemplary embodiment of the present disclosure, when a plurality of output devices 20 are provided, the motor controller 10 may generate a plurality of target sounds by being arranged corresponding to the number of the plurality of output devices 20. The set sound input to the target signal setting device 110 to generate a plurality of target sounds may be input as illustrated in FIGS. 13 to 15 according to an exemplary embodiment.

Figure 13:
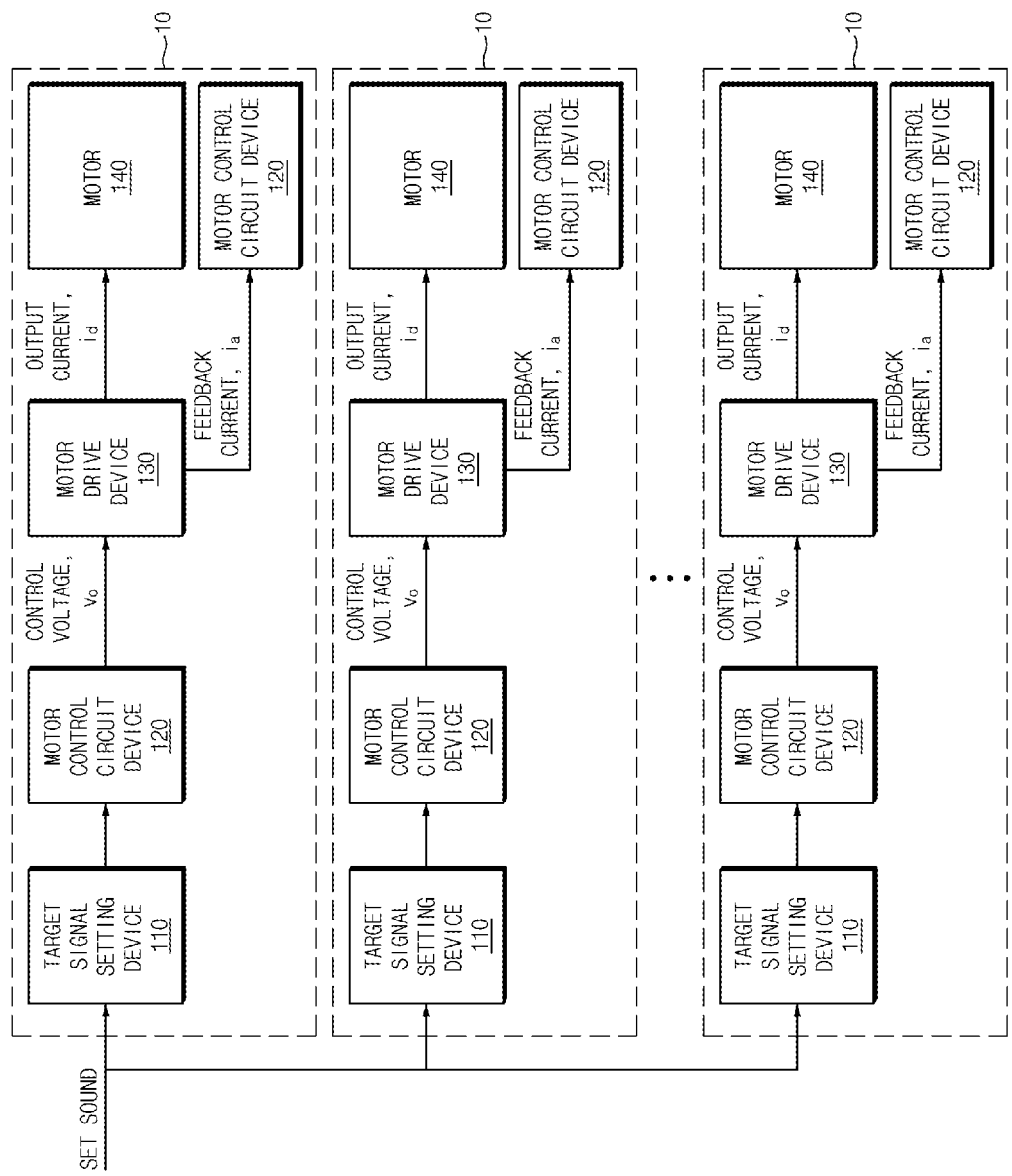
FIG. 13 is a diagram showing a configuration for generating a stereoscopic sound according to an exemplary embodiment of the present disclosure.
Figure 14:
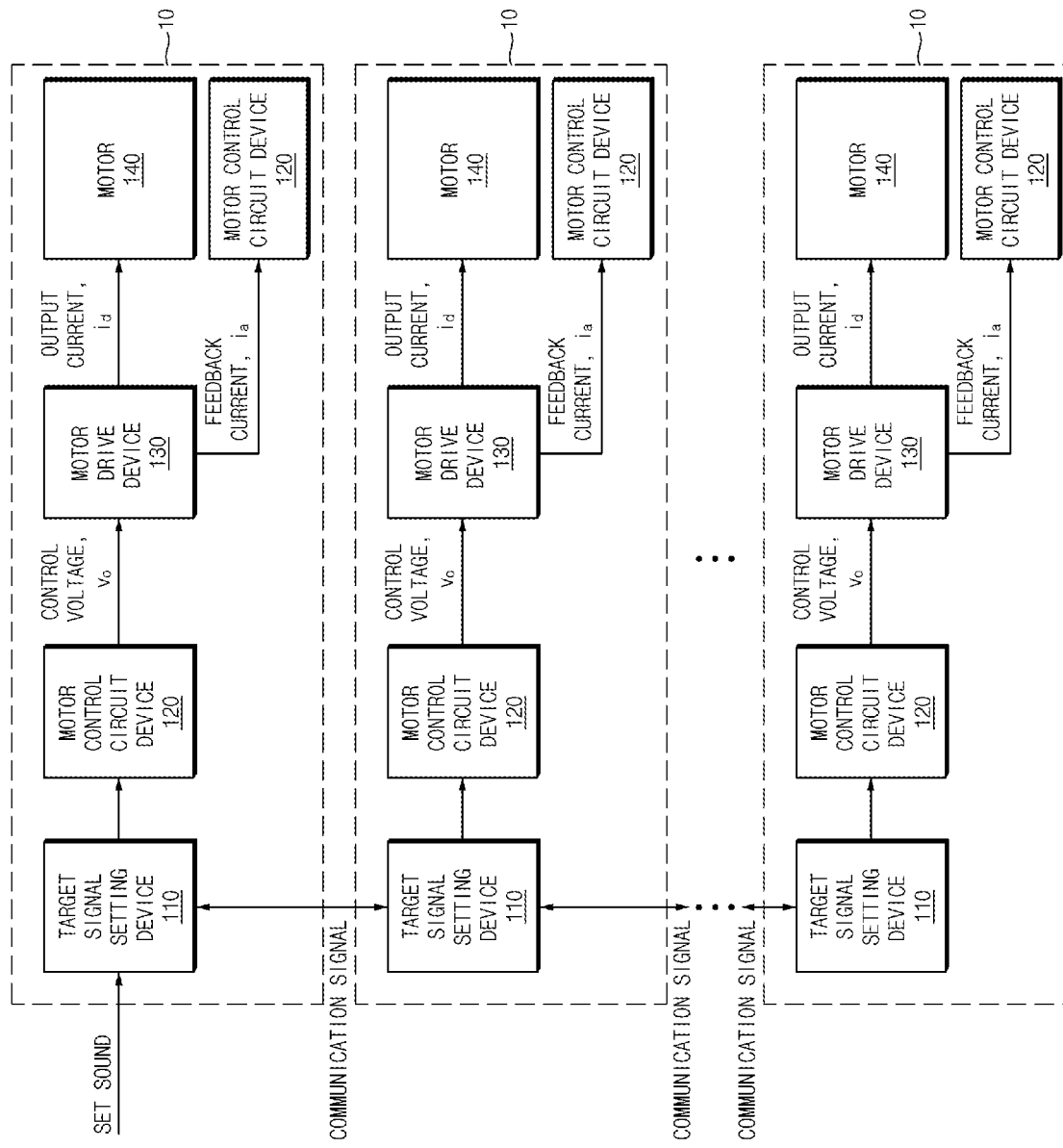
FIG. 14 is a diagram showing a configuration for generating a stereoscopic sound according to another exemplary embodiment of the present disclosure.
Figure 15:
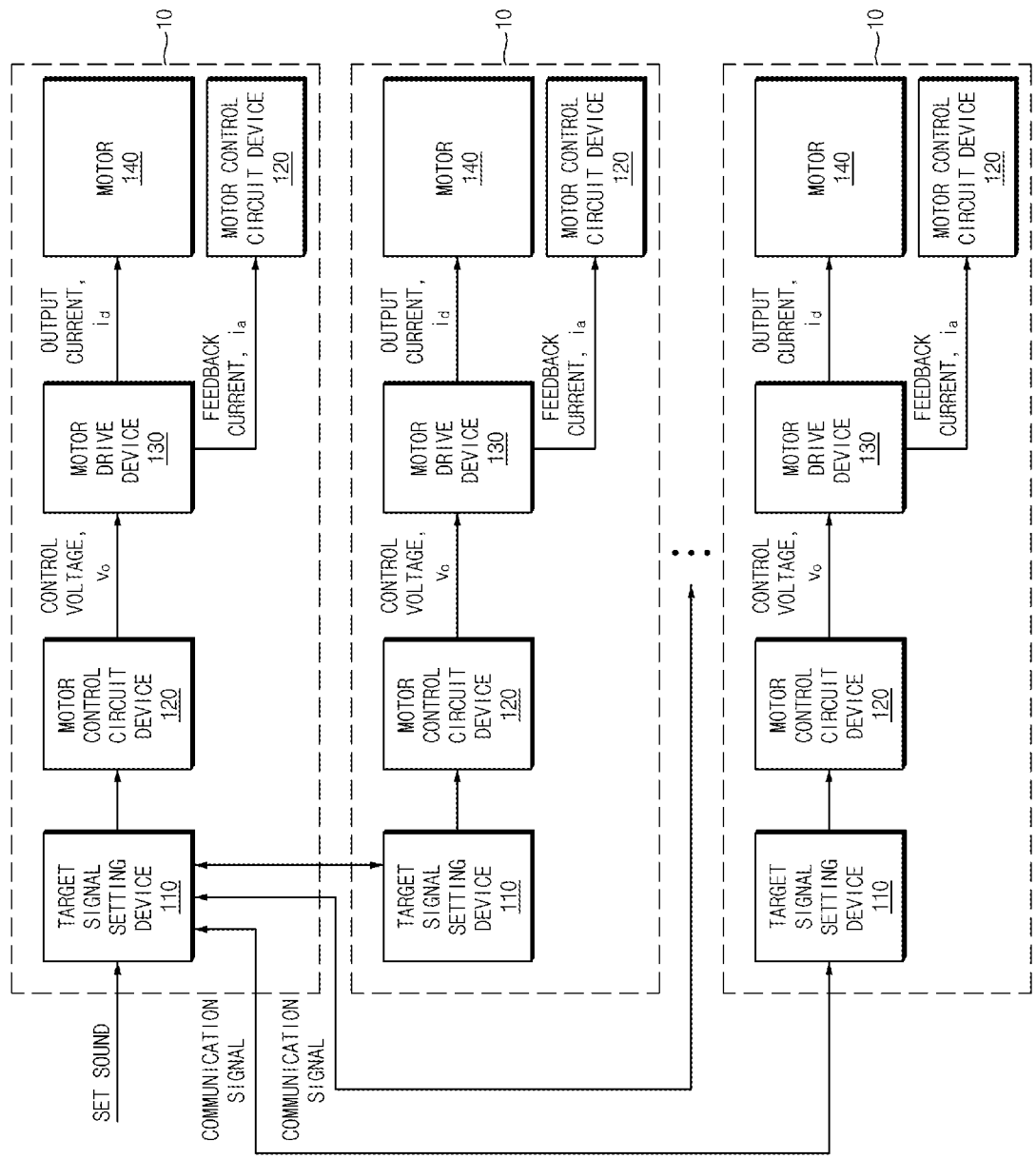
FIG. 15 is a diagram showing a configuration for generating a stereoscopic sound according to still another exemplary embodiment of the present disclosure.

FIGS. 13 to 15 are views showing a configuration for generating a stereoscopic sound according to an exemplary embodiment of the present disclosure.

As shown in FIG. 13, the motor controller 10 may be arranged as many as the number of the output devices 20, and the set sound may be input to the target signal setting device 110 included in each motor controller 10.

As shown in FIG. 14, the motor controller 10 may be arranged as many as the number of the output devices 20, and when the set sound is input to the target signal setting device 110 of one of the plurality of motor controller 10, the plurality of target signal setting devices may communicate with each other to share the set sound.

FIG. 15 is a graph showing a configuration for generating a stereoscopic sound according to another exemplary embodiment of the present disclosure.

As shown in FIG. 15, the motor controller 10 may be arranged as many as the number of the output devices 20, and when the set sound is input to a target signal setting device of one of the plurality of motor controller 10, the target signal setting device to which the set sound has been input may communicate with the target signal setting devices that have not received the set sound to share the set sound.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to the vehicle sound generating apparatus and method according to an exemplary embodiment of the present disclosure, it is possible to prevent an increase in cost and weight by generating a vehicle sound without requiring an external amplifier or a separate actuator.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A sound generating apparatus for a vehicle comprising:
a motor controller configured to generate a motor torque corresponding to a target sound; and
an output device configured to output the target sound based on vibration generated by the motor torque,
wherein the output device includes:
a motor mounting portion configured to transfer the vibration generated by the motor torque; and
a vehicle body panel configured to generate the target sound due to the vibration of the motor mounting portion.

2. The sound generating apparatus of claim 1, wherein the motor controller includes:
a target signal setting device configured to output a target current for generating the target sound;
a motor control circuit device configured to calculate a motor drive control voltage based on the target current;
a motor drive device configured to adjust a motor drive current based on the motor drive control voltage; and
a motor configured to generate the motor torque when the motor drive current is applied to the motor.

3. The sound generating apparatus of claim 2, wherein the target signal setting device includes:
an Analog-to-Digital (AD) converter configured to convert a set sound corresponding to the target sound into a digital signal;
a target sound signal generator configured to filter the digital signal;
a motor-specific function operating signal generator configured to operate a motor-specific function; and
a signal synthesizer configured to output the target current by synthesizing signals output from the target sound signal generator and the motor-specific function operating signal generator.

4. The sound generating apparatus of claim 2, wherein the motor control circuit device includes:
a Proportional-Integral-Derivative (PID) controller configured to receive power of a motor control power supply and perform feedback control of the target current;
a noise processor configured to remove a noise of the target current on which the feedback control has performed; and
a Pulse-Width Modulation (PWM) control circuit device configured to calculate the motor drive control voltage based on the target current processed by the PID controller and the noise processor.

5. The sound generating apparatus of claim 4, wherein the noise processor:
compares a value of the target current on which the feedback control is performed from the PID controller with a preset reference value in a magnitude,
determines whether an overshoot in which the value of the target current on which the feedback control is performed exceeds the reference value,
when the overshoot occurs, removes the overshoot,
when the overshoot does not occur, detects a signal waveform of the target current on which the feedback control is performed,
determines whether distortion of the waveform occurs by comparing the signal waveform of the target current on which the feedback control is performed with a target waveform corresponding to the target sound, and
when the signal waveform of the target current on which the feedback control is performed is distorted, removes the distortion using a digital filter.

6. The sound generating apparatus of claim 2, wherein the motor drive device includes:
a gate driver circuit device including a plurality of gate drivers that control a state of a motor drive switch according to the motor drive control voltage; and
a motor drive circuit device including the motor drive switch that adjusts the motor drive current output to the motor and a current sensor circuit device.

7. The sound generating apparatus of claim 2, wherein a rotor of the motor rotates to generate the motor torque when an electric field is generated in the motor by applying the motor drive current and includes a drive shaft of the motor that vibrates due to the motor torque and a stator of the motor.

8. The sound generating apparatus of claim 1, wherein the motor mounting portion includes:
- a motor mounting bracket configured to vibrate due to vibration of a stator of a motor;
- a drive gear arranged on one side of a drive shaft of the motor to vibrate due to the vibration of the drive shaft of the motor;
- a reduction gear configured to receive the vibration by rotating while being engaged with the drive gear;
- a linear motion gear configured to be driven while being engaged with the reduction gear to receive the vibration; and
- a gear mounting portion having the linear motion gear.

9. The sound generating apparatus of claim 1, wherein the vehicle body panel includes:
- a motor mounting body panel configured to output the target sound by vibration transferred to a motor mounting bracket; and
- a gear mounting body panel configured to output the target sound by vibration transferred to a gear mounting portion.

10. The sound generating apparatus of claim 1, wherein, when the output device comprises a plurality of output devices, and
- wherein the motor controller comprises a number of motor controllers corresponding to a number of the plurality of output devices to generate a plurality of target sounds.

11. The sound generating apparatus of claim 10, wherein a set sound is input to a plurality of target signal setting devices.

12. The sound generating apparatus of claim 10, wherein, when there are a plurality of output sounds, a plurality of target signal setting devices communicate with one another to share a set sound when the set sound is input to one of the target signal setting devices.

13. The sound generating apparatus of claim 10, wherein, when there are a plurality of output sounds, one target signal setting device to which a set sound is input communicates with a target signal setting device to which the set sound is not input to share the set sound when the set sound is input to one of target signal setting devices.

14. A sound generating method for a vehicle, the method comprising:
- generating a motor torque corresponding to a target sound; and
- outputting the target sound based on vibration generated by the motor torque,
- wherein the outputting the target sound includes transferring vibration generated by the motor torque to a vehicle body panel to generate the target sound.

15. The method of claim 14, wherein the generating of the motor torque includes:
- outputting a target current for generating the target sound;
- calculating a motor drive control voltage based on the target current;
- adjusting a motor drive current based on the motor drive control voltage; and
- generating the motor torque when the motor drive current is applied to a motor.

* * * * *

UNITED STATES PATENT AND TRADEMARK OFFICE
CERTIFICATE OF CORRECTION

PATENT NO. : 11,623,563 B2
APPLICATION NO. : 16/944807
DATED : April 11, 2023
INVENTOR(S) : Kyoung Jin Chang, Young Hoon Cho and Do Hong Lee It is certified that error appears in the above-identified patent and that said Letters Patent is hereby corrected as shown below:

On the Title Page

Column 1, Item (73), replace the present listing with the following:
-- (73) Assignees: HYUNDAI MOTOR COMPANY, Seoul (KR); KIA MOTORS CORPORATION, Seoul (KR); Konkuk University Industrial Cooperation Corp., Seoul (KR) --

Signed and Sealed this
Sixth Day of June, 2023

Katherine Kelly Vidal
*Director of the United States Patent and Trademark Office*